US008838162B2

(12) United States Patent
Sun et al.

(10) Patent No.: US 8,838,162 B2
(45) Date of Patent: Sep. 16, 2014

(54) POWER CONTROL METHOD IN COGNITIVE RADIO COMMUNICATION, COGNITIVE RADIO COMMUNICATION SYSTEM, AND RADIO COMMUNICATION DEVICE

(75) Inventors: Chen Sun, Tokyo (JP); Yohannes Alemseged Demessie, Tokyo (JP); Ha Nguyen Tran, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 395 days.

(21) Appl. No.: 13/384,447

(22) PCT Filed: Jul. 15, 2010

(86) PCT No.: PCT/JP2010/004613
§ 371 (c)(1),
(2), (4) Date: Feb. 15, 2012

(87) PCT Pub. No.: WO2011/007576
PCT Pub. Date: Jan. 20, 2011

(65) Prior Publication Data
US 2012/0135780 A1 May 31, 2012

(30) Foreign Application Priority Data
Jul. 17, 2009 (JP) ................. 2009-168508

(51) Int. Cl.
*H04B 7/00* (2006.01)
*H04W 52/24* (2009.01)
(52) U.S. Cl.
CPC .............. *H04W 52/241* (2013.01); *Y02B 60/50* (2013.01)
USPC ........ 455/522; 455/501; 455/504; 455/422.1; 455/507; 455/515
(58) Field of Classification Search
CPC ......................... H04W 52/241; H04W 52/143
USPC ................. 455/522, 501, 504, 442, 507, 515
See application file for complete search history.

(56) References Cited

U.S. PATENT DOCUMENTS 8,060,035 B2 * 11/2011 Haykin ...................... 455/115.1
2008/0130527 A1 6/2008 Huh et al.

FOREIGN PATENT DOCUMENTS

JP 2007-519327 7/2007
WO 2008/031059 3/2008

OTHER PUBLICATIONS

English translation of the International Search Report mailed Oct. 12, 2010, for corresponding International Application No. PCT/JP2010/004501.

(Continued)

*Primary Examiner* — Sanh Phu
(74) *Attorney, Agent, or Firm* — Myers Wolin, LLC

(57) ABSTRACT

Provided is a power control method, etc., in cognitive radio communication, by which power control can be effectively performed without a large indirect cost. In the power control method, a target value of SNR is estimated on the basis of the control information relating to interference. Subsequently, communication power used for the cognitive radio communication is adjusted on the basis of the estimated target value of SNR. Thereby, power control can be effectively performed without a large indirect cost.

3 Claims, 9 Drawing Sheets

(56) References Cited

OTHER PUBLICATIONS

Qing Zao, A Survey of Dynamic Spectrum Access : Signal processing, networking, and regulatory policy, IEEE Signal Processing Magazine, IEEE, May 2007, pp. 79 to 89.

Chen Sun et al., Power Control of Cognitive Radio System in Rayleigh Fading, Global Telecommunications Conference, 2009. GLOBECOM 2009. IEEE, IEEE, Nov. 30, 2009, pp. 1 to 6.

* cited by examiner

POWER CONTROL METHOD IN COGNITIVE RADIO COMMUNICATION, COGNITIVE RADIO COMMUNICATION SYSTEM, AND RADIO COMMUNICATION DEVICE

CROSS REFERENCE TO RELATED APPLICATIONS

The present disclosure is a national phase filing under 35 U.S.C. §371 of International Patent Application No. PCT/JP2010/004613 filed on Jul. 15, 2010, which claims priority to Japanese Patent Application No. 2009-168508 filed on Jul. 17, 2009, the disclosures of each of which are expressly incorporated herein by reference in their entireties.

TECHNICAL FIELD

The present invention relates to a power control method in cognitive radio communication, a cognitive radio communication system, a radio communication device and the like.

BACKGROUND ART

A dynamic spectrum access (DSA) is for the efficient use of spectrum resources. With the dynamic spectrum access, a radio communication system can correspond to a large number of users (user terminals) as compared with a conventional radio communication system and the throughput can be increased.

As the radio communication system using the dynamic spectrum access (DSA), a cognitive radio system (CRS) is known. In the cognitive radio system (CRS), an unlicensed secondary user (SU) is permitted to have dynamic access to a spectrum licensed to a primary user (PU) that can perform radio communication.

In the cognitive radio system (CRS), spectrum sensing is performed to realize the dynamic spectrum access (DSA). In addition, in the cognitive radio system, a spectrum use situation is analyzed on the basis of sensing information obtained as the result of the spectrum sensing and an accessible spectrum (white space) is determined. Thereby, the secondary user (SU) can perform communication using the white space.

Meanwhile, in the cognitive radio system, when the secondary user (SU) cannot detect a pilot signal of the primary user (PU) and starts communication with the same frequency band as a spectrum used by the primary user (PU), interference is caused. Further, when the secondary user (SU) performs communication with power greater than a predetermined limit value, the interference is caused.

A technology for setting interference restriction to the secondary user (SU) to prevent the interference from being generated in communication of the primary user (PU) is suggested (for example, see Non-Patent Document 1). According to the technology described in Non-Patent Document 1, beam forming is performed to suppress the interference.

In this case, in order to perform the beam forming, the secondary user (SU) needs to obtain momentary channel information relating to a channel from a radio transmitter of the secondary user (SU) to a radio receiver of the primary user (PU). However, in order to obtain the momentary channel information, it is needed to track a statistical characteristic of a fading channel from the secondary user (SU) to the primary user (PU) in a short period of time. For this reason, a process for obtaining necessary information is complicated. As a result, an indirect cost (overhead) of the radio communication system increases.

PRIOR ART DOCUMENTS

Patent Documents

Non-Patent Document 1: Q. Zhao and B. M. Sadler, "A survey of dynamic spectrum access: Signal processing, networking, regulatory policy", IEEE Signal Processing Magazine, vol. 24, no. 3, pp. 79-89, May 2007.

SUMMARY OF INVENTION

Technical Problem

Accordingly, it is an object of the present invention to provide a power control method and a cognitive radio communication system that can efficiently perform power control without a large indirect cost (overhead) in cognitive radio communication. Further, it is another object of the present invention to provide a radio communication device configured to perform the cognitive radio communication.

Solution to Problem

The present invention relates to a power control method that controls communication power to be used for cognitive radio communication. In the power control method, an estimating step of estimating a target value of an SNR on the basis of control information relating to interference and an adjusting step of adjusting the communication power on the basis of the target value of the SNR estimated by the estimating step are executed. Thereby, power control can be efficiently performed without a large indirect cost. One of the control information relating to the interference is an interference power level $\eta$ which shows an interference power level in a radio receiver of a primary user (PU). The other control information relating to the interference is the maximum probability $\xi$ which shows the maximum value of the probability when an interference value in the primary user (PU) exceeds the interference power level $\eta$.

In another aspect of the present invention, a radio communication system that performs the cognitive radio communication includes a base station for the cognitive radio communication, a first radio communication device that can perform radio communication, and a second radio communication device that can perform the radio communication. In this case, the first radio communication device includes a radio receiver and the second radio communication device includes a radio transmitter. In addition, in the power control method, a step of transmitting the control information relating to the interference to the radio receiver of the first radio communication device by the base station is further executed.

In this case, in the estimating step, the radio receiver of the first radio communication device estimates the target value of the SNR on the basis of the control information and notifies the radio transmitter of the second radio communication device of a command including the target value of the SNR. In the adjusting step, the radio transmitter of the second radio communication device adjusts transmission power to transmit a radio signal to the second radio communication device on the basis of the target value of the SNR. Thereby, the first radio communication device performs the cognitive radio communication with the second radio communication device with the above-described transmission power.

In another aspect of the present invention, the SNR corresponds to one constant output value that is selectable from a plurality of constant output values. In this case, in the adjusting step, there are performed a step of selecting a maximum value in the constant output values not exceeding the target value of the SNR, among the plurality of constant output values, and a step of changing an output value to the constant output value selected as the maximum value for adjusting the communication power. Thereby, the cognitive radio communication can be performed with the maximum power in a range according to the control information relating to the interference.

Another aspect of the present invention relates to a cognitive radio communication system that includes a plurality of radio communication devices. The cognitive radio communication system includes a first radio communication device that estimates a target value of an SNR on the basis of control information relating to interference and a second radio communication device that adjusts the communication power on the basis of the target value of the SNR. Thereby, the cognitive radio communication can be performed with the adjusted communication power between the first radio communication device and the second radio communication device. Therefore, the same effect as the above-described effect can be achieved.

Another aspect of the present invention relates to a radio communication device configured to perform cognitive radio communication. The radio communication device includes a unit that adjust communication power to be used for the cognitive radio communication on the basis of a target value of an SNR estimated by another radio communication device on the basis of control information relating to interference. Thereby, the cognitive radio communication can be performed with the adjusted communication power between another radio communication device and the radio communication device. Therefore, in this case, the same effect as the above-described effect can be achieved.

Advantageous Effects of Invention

According to the present invention, power control can be efficiently performed without a large indirect cost in the cognitive radio communication.

DESCRIPTION OF EMBODIMENTS

Hereinafter, an embodiment to carry out the present invention will be described using the drawings. However, the embodiment to be described below is exemplary and can be appropriately modified in a range that is apparent to those skilled in the art.

Figure 1:
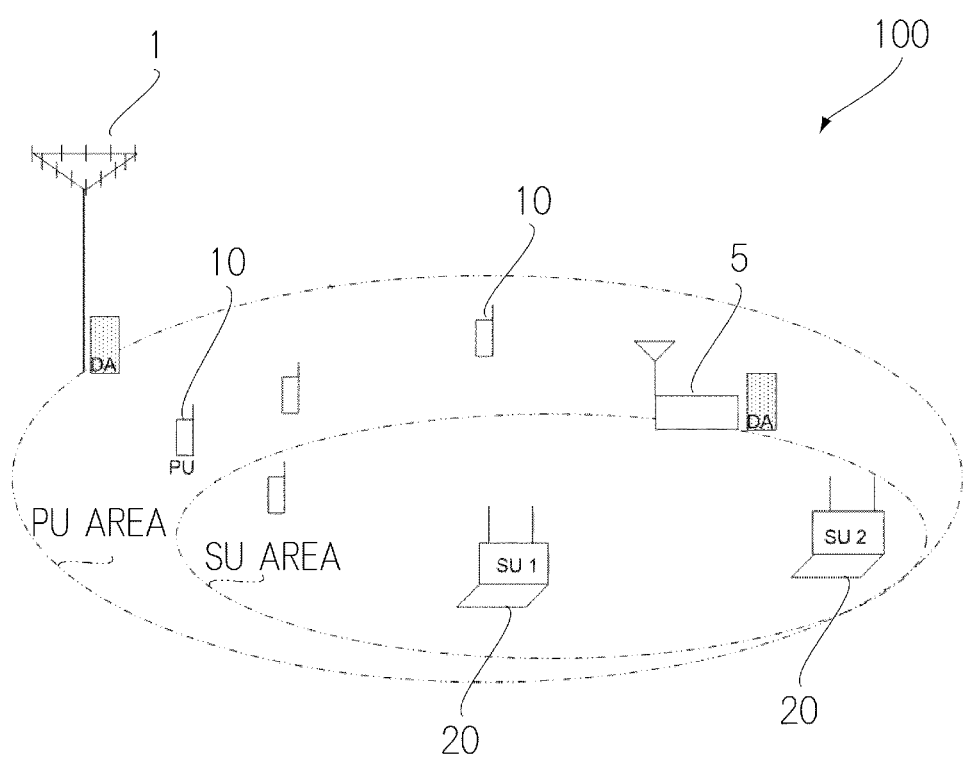
FIG. 1 a diagram schematically illustrating a structure of a cognitive radio communication system where a power control method according to the present invention is executed.

FIG. 1 is a diagram schematically illustrating a structure of a cognitive radio communication system where a power control method according to the present invention is executed.

A cognitive radio communication system 100 illustrated in FIG. 1 includes a first base station 1, a second base station 5, a plurality of first radio communication devices 10, and a plurality of second radio communication devices 20. The number of each of the base stations 1 and 5 that are included in the cognitive radio communication system 100 may be plural. The number of each of the radio communication devices 10 and 20 that are included in the cognitive radio communication system 100 may be two or more.

The first base station 1 controls the first radio communication device 10 or the second radio communication device 20. Specifically, the first base station 1 transmits instruction information needed for radio communication as a radio signal to the first radio communication device 10 or the second radio communication device 20. The first base station 1 includes a data archive (DA) and generates instruction information on the basis of information stored in the data archive (DA). An area where the radio signal including the instruction information can arrive corresponds to an area (coverage) where the first radio communication device 10 or the second radio communication device 20 can receive the radio signal. The area becomes an area (or space) where the first radio communication device 10 or the second radio communication device 20 can perform radio communication in the cognitive radio communication. For this reason, the radio communication device in the area becomes a primary user (PU) in the cognitive radio communication. Therefore, in the specification, the area is also called a PU area.

The second base station 5 is disposed in the PU area of the first base station and relays the instruction information from the first base station 1 or transmits the instruction information in place of the first base station 1 if necessary. Therefore, the second base station 5 also controls the first radio communication device 10 or the second radio communication device 20. The second base station 5 includes a data archive (DA) and generates instruction information on the basis of the information stored in the data archive (DA). The second base station 5 transmits instruction information needed for the cognitive radio communication. An area where the radio signal including the instruction information can arrive corresponds to an area (coverage) where the first radio communication device 10 or the second radio communication device 20 can receive the radio signal. The area is generally narrower than the PU area. The area becomes an area (or space) where the first radio communication device 10 or the second radio communication device 20 can perform the cognitive radio communication. In other words, the radio communication device in the area becomes a secondary user (SU) that can perform the cognitive radio communication using the white space of the primary user (PU). Therefore, in the specification, the area is also called an SU area.

Both the first radio communication device 10 and the second radio communication device 20 are devices that can perform the radio communication. The radio communication devices 10 and 20 may be portable devices (for example, a mobile phone or a note-type personal computer) or standing devices. In the specification, the first radio communication device 10 corresponds to a radio communication device that functions as only the primary user (PU) in the cognitive radio communication system 100 and the second radio communication device 20 corresponds to a radio communication device that can function as the secondary user (SU) in the cognitive radio communication system 100.

Figure 2:
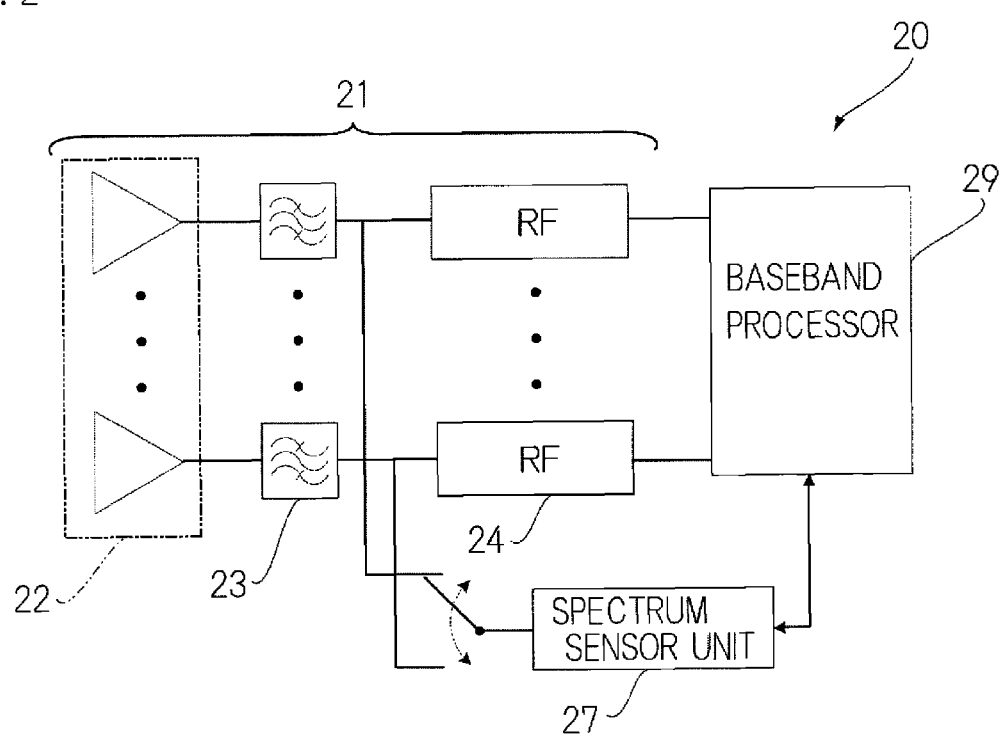
FIG. 2 is a block diagram schematically illustrating a structure of a second radio communication device that functions as a secondary user (SU) in the radio communication system of FIG. 1.

FIG. 2 is a block diagram schematically illustrating a structure of the second radio communication device 20 that functions as the secondary user (SU) in the radio communication system 100 of FIG. 1.

In FIG. 2, the second radio communication device 20 includes a receiving unit 21, a spectrum sensor unit 27, and a baseband processor 29.

The receiving unit 21 includes a multiple antenna 22, a plurality of bandpass filters 23, and a plurality of RFs 24.

The multiple antenna 22 is configured using a plurality (N) of single antennas in this aspect. However, the number of single antennas varies depending on the second radio communication device 20. The number of each of the plurality of bandpass filters 23 and the plurality of RFs 24 is the same as the number of single antennas constituting the multiple antenna 22. Respective bandpass filter 23 and RF 24 are connected in series to one single antenna. A radio signal that is input through each single antenna is input to the baseband processor. A frequency domain of each bandpass filter 23 may differ from or partially overlap the frequency domains that can be acquired by the other bandpass filters. Thereby, each bandpass filter 23 can acquire a radio signal in a wide frequency domain.

The spectrum sensor unit switches connection/disconnection between the bandpass filter and the RF on the basis of the signal input to the baseband processor. Thereby, the spectrum sensor unit can acquire a radio signal in a needed frequency band among radio signals received by the plurality of single antennas.

The structure illustrated in FIG. 2 can be applied to the first radio communication device 10 that functions as the primary user (PU). However, in the first radio communication device 10, the number of single antennas may be plural or one. In this aspect, the first radio communication device 10 includes one single antenna.

Next, a channel that is formed between the radio communication devices will be described.

Figure 3:
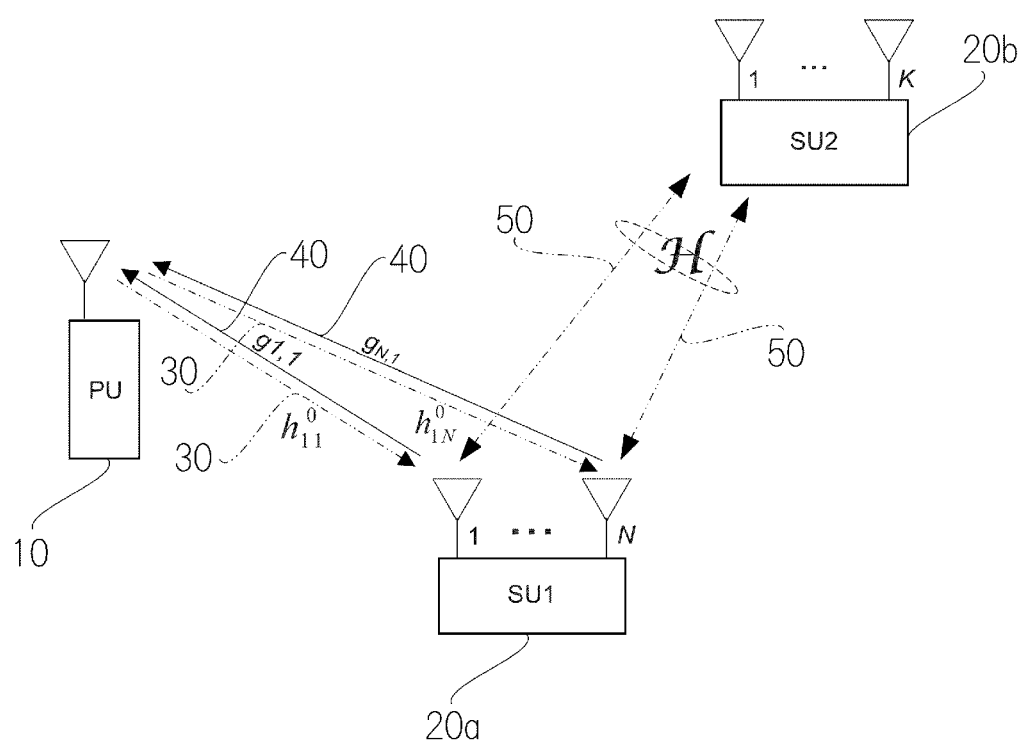
FIG. 3 is a diagram illustrating cognitive radio communication that is executed in the cognitive radio communication system of FIG. 1.

FIG. 3 is a diagram illustrating cognitive radio communication that is performed in the cognitive radio communication system 100 of FIG. 1. Specifically, FIG. 3 illustrates an example in a case where radio communication is performed between the two second radio communication devices 20 (20a and 20b) in a state in which the first radio communication device 10 is licensed.

As illustrated in FIG. 3, two kinds of channels are formed between the first radio communication device 10 functioning as the primary user (PU) and the second radio communication device 20 functioning as the secondary user (SU). One channel is a sensing channel 30 and this channel is a unidirectional channel from the primary user (PU) to the secondary user (SU). The other channel is an interference channel 40 and this channel is a unidirectional channel from the secondary user (SU) to the primary user (PU).

As illustrated in FIG. 3, a user channel 50 is formed between the two second radio communication devices 20a and 20b that function as the first and second secondary users (SU2). The number of user channels is determined according to the number of single antennas in one radio communication device 20 (for example, the radio communication device 20a) and the number of single antennas in the other radio communication device 20 (for example, the radio communication device 20a). In each user channel, bidirectional communication can be performed.

In the specification, in the three kinds of channels 30, 40, and 50 illustrated in FIG. 3, the same frequency domain is used and the radio communication is performed. Independent block fading is applied to the three kinds of channels 30, 40, and 50. In the channels 30, 40, and 50, a fading state of each channel is fixed during a communication period of one data frame. However, the fading state of each channel changes during a communication period of a plurality of data frames.

Figure 4:
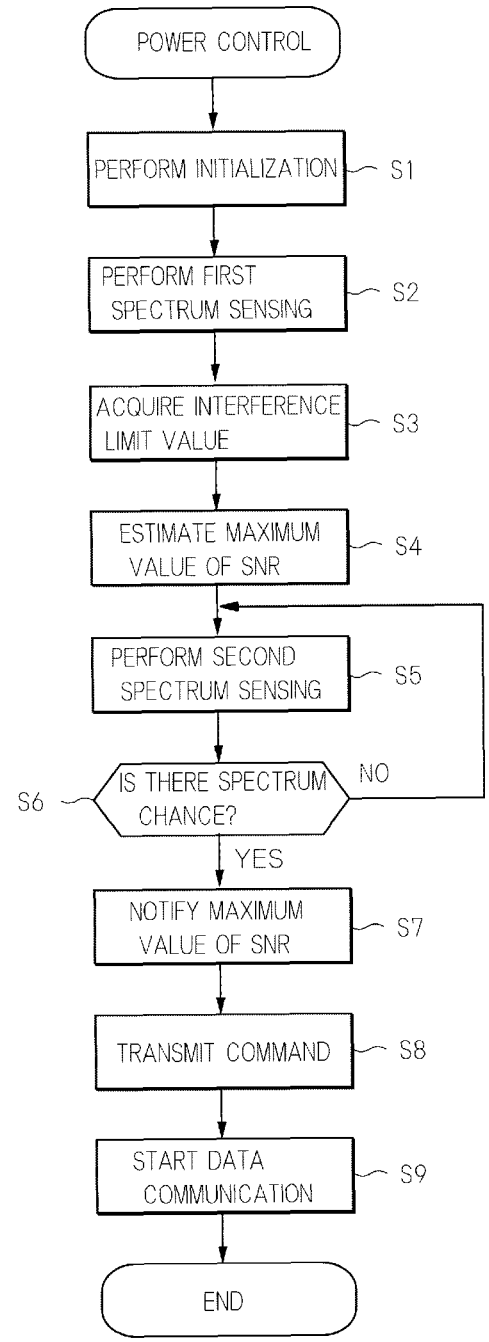
FIG. 4 is a flowchart illustrating a process sequence of the power control method that is executed in the cognitive radio communication system illustrated in FIG. 1.

FIG. 4 is a flowchart illustrating a process sequence of a power control method that is executed in the cognitive radio communication system 100 illustrated in FIG. 1. A process illustrated in FIG. 4 is executed when the cognitive radio communication is performed between the first and second secondary users (SU1 and SU2). In this case, most of the process illustrated in FIG. 4 is executed in a radio transmitter of the first secondary user (SU1).

In FIG. 4, first, processes of steps S1 to S8 are executed before the first secondary user (SU1) starts the cognitive radio communication with the second secondary user (SU2). In step S1, first, the radio transmitter and the radio receiver of the first secondary user (SU1) are initialized.

Next, in step S2, the radio receiver of the first secondary user (SU1) executes first spectrum sensing. By the first spectrum sensing, an available channel (for example, cognitive pilot channel (CPC) or an auxiliary control channel for spectrum sensing (ACS)) during service is specified as a control channel.

In step S3, the radio transmitter of the first secondary user (SU1) receives policy regulation information using the control channel specified in step S2. The policy regulation information includes information that shows an interference limit value of the primary user (PU). The policy regulation information is acquired from the data archive (DA) included in the base stations 1 and 5 in the cognitive radio communication system 100. When the data archive (DA) is disposed separately from the base stations 1 and 5, the radio transmitter of the first secondary user (SU1) may acquire the policy regulation information directly from the data archive (DA).

In this case, the interference limit value will be described. The information that shows the interference limit value can be specified by two parameters ($\eta$ and $\xi$). In this case, one parameter is an interference power level $\eta$ which shows an interference power level in the radio receiver of the primary user (PU). The other parameter is a maximum probability $\xi$ which shows the maximum value of the probability when an interference value in the primary user (PU) exceeds the interference power level $\eta$.

After the interference limit value is acquired, in step S4, the radio transmitter of the first secondary user (SU1) estimates the maximum value of the constant output SNRs satisfying the interference limit value in the radio receiver of the primary user (PU) among the constant output SNRs in the radio receiver of the second secondary user (SU2).

Next, in step S5, the radio transmitter of the first secondary user (SU1) performs second spectrum sensing. As the result of the second spectrum sensing, when information relating to a spectrum-usable chance (spectrum chance) cannot be specified (NO in step S6), this process is repeated.

Meanwhile, when the spectrum chance can be specified (YES in step S6), the radio transmitter of the first secondary user (SU1) notifies the radio receiver of the second secondary user (SU2) of the maximum value of the SNR estimated in step S4 (step S7).

In step S8, the radio receiver of the second secondary user (SU2) estimates a channel, generates a command on the basis of the estimation, and transmits the generated command to the radio transmitter of the first secondary user (SU1). In this case, the transmitted command is a command that causes the radio transmitter of the first secondary user (SU1) to increase or decrease transmission power on the basis of a target value of the output SNR.

In step S8, specifically, in each fading block, the radio receiver of the secondary user (SU) measures a fading state of the channel and notifies the radio transmitter of information relating to the measured fading state of the channel. In this case, the radio transmitter that receives the notification is a radio transmitter that requires the communication power to exceed the target value of the output SNR.

Then, in step S9, the cognitive radio communication is performed between the radio transmitter of the first secondary user (SU1) and the radio receiver of the second secondary user (SU2). Specifically, the radio transmitter of the first secondary user (SU1) adjusts the transmission power according to the command received in step S8 and transmits a radio signal (data) to the second secondary user (SU2) with the adjusted transmission power.

According to the aspect, when the cognitive radio communication is performed, the first secondary user (SU1) performs adjustment to increase or decrease the transmission power required in transmitting the radio signal to the second secondary user (SU2) on the basis of the target value of the output SNR. For this reason, in the cognitive radio communication, power control can efficiently be performed without a large indirect cost.

The adjustment is performed according to the command from the second secondary user (SU2). Since the adjustment can be performed according to the second secondary user (SU2), the power control can more efficiently be performed. By performing the adjustment according to the second secondary user (SU2), the cognitive radio communication between the primary users (PU) can be performed with high power (to the extent that no interference is given to the primary user (PU)). For this reason, the performance of the cognitive radio communication can be improved.

The command is generated on the basis of an interference limit value that is included in the policy regulation information from the primary user (PU). For this reason, interference of communication between the first secondary user (SU1) and the second secondary user (SU2) with respect to the primary user (PU) may drop below the interference limit value. Thereby, the performance in communication of the primary user (PU) can be maintained.

The adjustment is performed in consideration of an SNR value of the second secondary user (SU2). For this reason, the output SNR value in the radio receiver of the second secondary user (SU2) can be maximized as much as possible. Thereby, the performance (for example, bit error rate (BER)) of the cognitive radio communication can be improved.

As described in detail above, according to the aspect, the secondary user (SU) can use a spectrum to a maximum extent in a state in which the interference of the secondary user (SU) with respect to the primary user (PU) is restricted within a predetermined limit range by using the power control method illustrated in FIG. 4. In order to suppress the interference of the secondary user (SU) with respect to the primary user (PU), in the optimized power control method according to the present invention, the statistical characteristic of the fading channel may be tracked over a long period. Therefore, as compared with the beam forming method, the system can be prevented from becoming a heavy system requiring an indirect cost for tracking a fading state in a short period.

According to the aspect, the power control method is executed on the basis of a mean value of an INR of the interference channel over a long period and a mean value of an SNR of the user channel over a long period. By tracking the statistical characteristic of the fading channel over a long period, the spectrum can be used at minimum and the indirect cost of the radio communication system can be suppressed as compared with the case of using the beam forming method.

Since the power control method according to the aspect is executed on the basis of the statistical characteristic of the channel over a long period, momentary channel information is not needed. In this case, the statistical characteristic of the channel over a long period is a statistical characteristic of the channel between the radio transmitter of the secondary user and the radio receiver of the primary user and is used to calculate the maximum value of the output SNR in the secondary user. Therefore, in the aspect, it is easy to obtain the information relating to the statistical characteristic over a long period. Meanwhile, in the conventional power control method, it is needed to acquire information relating to the momentary channel information from the radio transmitter of the secondary user to the primary user and it is difficult to obtain the information. As can be seen from the comparison, in the power control method according to the aspect, the indirect cost (overhead) of the radio communication system can be decreased as compared with the power control method in the related art.

Embodiment

Next, an embodiment of the present invention (first embodiment and first comparative example) will be described. Specifically, in the embodiment, analysis models are constructed with respect to the first embodiment and the first comparative example, simulation is performed with respect to each analysis model, and performance of the first embodiment and performance of the first comparative example are compared with each other.

<System Model>

The system model becomes a premise of the analysis model and is constructed as follows in this embodiment.

In the cognitive radio communication system illustrated in FIG. 1, when a situation where the primary user (PU) is not active is set as a hypothesis $H_0$, a signal $x_i$ that is received by the i-th antenna of the secondary user (SU) is represented by the following equation (1).

$$x_i = z_i \qquad (1)$$

In the above equation (1), $z_i$ of the right side is additive white Gaussian noise (AWGN) in a receiving antenna of each secondary user (SU). However, with respect to the receiving antenna, an independent and identically distributed random variable (i. i. d. RV.) is modeled as having a zero mean and a dispersion value $\sigma_z^2$.

In addition, when a situation where the primary user (PU) is active is set as a hypothesis $H_1$, a signal $x_i$ that is received from the primary user (PU) by the i-th antenna of the secondary user (SU) is represented by the following equation (2).

[Formula 1]

Formula 1

$$= x_i = \sqrt{G_S} h_{1,i}^0 u + z_i \qquad (2)$$

In the above equation (2), an index i is an index that shows each antenna and takes an integer value of 1 to N. In the above equation (2), $h^0_{1,i}$ shows a channel that is a momentary sensing channel and has path loss $G_S$ between the primary user (PU) and the i-th antenna of the secondary user (SU). The path loss $G_S$ shows fading factor in a small scale and is modeled with a random variable RV of complex circular Gaussian having a zero mean and a unit variable. In the above equation (2), u is a signal of the primary user (PU) that has power $\sigma_u^2$.

In addition, it is assumed that fading in each antenna is independent. A momentary SNR value $\rho_{1,i}$ of the sensing channel that is observed by the i-th antenna of the secondary user (SU) is given by the following equation (3-1). Thereby, the mean value $\Gamma_0$ of the SNR of the sensing channel is given by the following equation (3-2).

$$\rho_{1,\Gamma} = G_S G_S \sigma_u^2 |h^0_{1,i}|^2 / \sigma_z^2 \qquad (3\text{-}1)$$

$$\Gamma_0 = G_S \sigma_u^2 / \sigma_z^2 \qquad (3\text{-}2)$$

When the secondary user (SU) needs to perform transmission while the communication of the primary user (PU) is performed, the secondary user (SU) calculates an interference value with respect to the primary user (PU). The interference value includes a momentary interference-to-noise ratio (INR) included in the following equation (4).

[Formula 2]

Formula 2

$$I_n = \frac{G_I P_t \sigma_s^2}{N \sigma_w^2} \sum_{i=1}^{N} |g_{i,1}|^2 \qquad (4)$$

In the above equation (4), $P_t$ is a power control coefficient and $g_{i,1}$ is a momentary interference channel. The momentary interference channel includes path loss $G_\Gamma$ between the i-th transmission antenna of the secondary user (SU) and the receiving antenna of the primary user (PU). The path loss $G_I$ is a fading factor in a small scale and is modeled with a random variable RV of complex circular Gaussian having a zero mean and a unit variable. In the above equation (4), $\sigma_s^2$ is power of the secondary user (SU) and $\sigma_w^2$ is AWGN in the radio receiver of the primary user (PU).

A mean value $\Gamma_1$ of the INR over the long period in the case of using a single antenna for transmission in the secondary user (SU) with respect to the interference channel is represented by the following equation (5).

$$\Gamma_1 = G_I \sigma_s^2 / \sigma_z^2 \qquad (5)$$

Next, the case where the first secondary user (SU1) performs transmission with respect to the second secondary user (SU2) is considered.

Before the transmission, the first secondary user (SU1) performs the first spectrum sensing as described above (step S2 of FIG. 4). When the first secondary user (SU1) does not sense existence of the signal of the primary user (PU), the first secondary user (SU1) regards the current situation as the spectrum-usable chance (YES in step S6) and data communication between the secondary users (SU) starts (step S9). In this case, in each secondary user (SU), maximum ratio combining (MRC) is adopted in each of the communicating fading blocks. In this case, the momentary output SNR in the user channel can be observed by the radio receiver of the second secondary user (SU2) and is given by the following equation (6) in this simulation.

[Formula 3]

Formula 3

$$SNR_0 = \frac{G_U P_t \sigma_s^2}{N \sigma_n^2} \sum_{i=1}^{N} \sum_{k=1}^{K} |h_{i,k}|^2 \qquad (6)$$

In the above equation (6), $h_{i,k}$ is a momentary user channel. In the momentary user channel, path loss $G_U$ between the i-th transmitting antenna of the first secondary user (SU1) and the k-th receiving antenna of the second secondary user (SU2) is included. The path loss $G_U$ is a fading factor in a small scale and is modeled with a random variable RV of complex circular Gaussian having a zero mean and a unit variable. In the above equation (6), $\sigma_n^2$ is power of noise of each receiving antenna of the second secondary user (SU2). A mean value $\Gamma_2$ of the SNR of the user channel over a long period when the first secondary user (SU1) uses a single antenna for transmission is defined by the following equation (7).

$$\Gamma_2 = G_U \sigma_s^2 / \sigma_n^2 \qquad (7)$$

<Spectrum Sensing>

Next, energy detection (ED) will be described as an example of a method of performing spectrum sensing. In the energy detection (ED), a device that has small consumption power can be used and easy improvement can be made. The method of performing the spectrum sensing is not limited to the energy detection (ED) and may be matched filter detection, cyclostationary property detection or the like.

Specifically, the probability of detection by the energy detection (ED) in the AWGN channel and a false alarm rate will be described. The probability of detection in a Rayleigh fading channel will be described later.

In the energy detection (ED), first, a detection statistical value is compared with a threshold value for detection and hard determination information is generated. In this case, the hard determination information is represented by "1" or "0". When the hard determination information is "1", this corresponds to the case where the signal of the primary user (PU) exists and when the hard determination information is "0", this corresponds to the case where the signal of the primary user (PU) does not exist.

In addition, a detection statistical value of the i-th antenna of the first primary user (SU1) is represented by the following equation (8).

[Formula 4]

Formula 4

$$T_i = \sum_{k=1}^{N_0} |x_i(k)|^2 \qquad (8)$$

In the above equation (8), $x_i(k)$ shows the k-th sample in a signal $x_i$. $N_0$ shows the total number of samples.

A false alarm rate with respect to a predetermined detection threshold value $\gamma_0$ under the situation of the hypothesis $H_0$ is represented by the following equation (9).

[Formula 5]

Formula 5

$$P_f(\gamma_0, N_0, \sigma_z) = \frac{\Gamma\left(N_0, \frac{\gamma_0}{2\sigma_z^2}\right)}{\Gamma(N_0)} \quad (9)$$

In the above equation (9), $\Gamma(\ldots,\ldots)$ is an incomplete gamma coefficient and $\Gamma(\ldots)$ is a gamma coefficient. By using the above equation (9), a detection threshold value that corresponds to a predetermined false alarm rate can be calculated.

Under the situation of the hypothesis $H_1$, a detection statistical value conforms to a noncentral chi-square distribution. In the case where the predetermined user channel has a momentary SNR $\rho_{1,i}$, the probability $P_d$ of detection when $N_0$ signal samples from the i-th antenna are used by the energy detection (ED) is represented by the following equation (10).

[Formula 6]

Formula 6

$$P_d = Q_{N_0}\left(\sqrt{2\rho_{1,i}N_0}, \sqrt{\frac{2\gamma_0}{\sigma_z^2}}\right) \quad (10)$$

In the above equation (10), $Q_M(\ldots,\ldots)$ is a generalized Marcum Q function. The probability of the miss detection (MD) corresponds to $1-P_d$.

<Analysis Model>

Next, the analysis model is constructed.

An analysis model according to the first embodiment is based on the optimized power control method according to the present invention and an analysis model according to the first comparative example is based on a simple fixed power control method. As described below, in this embodiment, performances of both the analysis models are compared with each other by performing simulation to the analysis models.

The construction of the analysis model will be described in the following sequence. First, derivation of a mathematical expression of a closed form relating to the probability of detection will be described. Second, the case where a process is executed according to each of the two methods will be described. Third, the case where each power control method is set up to an analysis model for transmission in the secondary user (SU) using the mathematical expression of the closed form will be described. The numerical result will be described later.

<<Energy Detection with Selective Combining Under Rayleigh Fading>>

First, in order to derive the mathematical expression of the closed form relating to the probability of detection, the energy detection (ED) is used together with the selective combining under the Rayleigh fading based on the result of the energy detection (ED).

Before the communication starts, the first secondary user (SU1) performs spectrum sensing and obtains the spectrum-usable chance. In this case, the first secondary user (SU1) is assumed to use the energy detection (ED) together with the selective combining (SC) using the multiple antenna. The spectrum sensor unit illustrated in FIG. 2 selects one of branches (contacts between the bandpass filter and the RF) of the multiple antenna as described above. In this case, the selected branch is the one in which the maximum value is observed in the momentary SNR of the sensing channel to perform the spectrum sensing. Information that is needed to select the branch is previously acquired from a pilot signal from the primary user (PU) or a beacon. In this way, the spectrum sensor can be mounted independently from the number of antennas while an advantage of diversity which can be obtained from the multiple antenna is maintained.

In this case, as the i. i. d. RV, $r_i$ (in this case, the index i is an integer of 1 to N) is considered. The i. i. d. RV conforms to the Rayleigh fading that has the zero mean. The zero mean (that is, $r_i^2$) conforms to an exponential distribution as represented by the following equation (11).

[Formula 7]

Formula 7

$$f_{r_i^2}(\chi) = e^{-\chi} \quad (11)$$

In this case, by defining the following equation (12) and using a standard RV conversion, a probability density function (PDF) of $r_{SC}$ in the following equation (12) is represented by the following equation (13).

$$r_{SC} = \max\{r_1, r_2, \ldots, r_N\} \quad (12)$$

[Formula 8]

Formula 8

$$f_{r_{SC}}(x) = 2Lx\left(1 - e^{-x^2}\right)^{N-1} e^{-x^2} \quad (13)$$

In the above equation (10), if the probability $P_d$ of detection relating to the momentary realization of the sensing channel is known, it is already known that the momentary sensing channel can be expressed by the Marcum Q function (that is, $Q_M(ax, b)$). Therefore, using the above equation (13), the probability that is detected by the energy detection (ED) using the selective combining (SC) in the Rayleigh fading channel is generalized as represented by the following equation (14).

[Formula 9]

Formula 9

$$\bar{P}_{d,SC}(N, N_0) = \int_0^\infty f_{r_{SC}}(x) Q_{N_0}(ax, b) dx \quad (14)$$

$$= 2N \int_0^\infty e^{-x^2} x Q_{N_0}(ax, b) \sum_{n=0}^{N-1} \binom{N-1}{n}(-e^{-x^2})^n dx$$

$$= 2N \sum_{n=0}^{N-1} (-1)^n \binom{N-1}{n} \int_0^\infty e^{-(n+1)x^2} x Q_{N_0}(ax, b) dx.$$

By using the known equation (for example, the equation described in IEEE Trans. Inform. Theory by A. H. Nuttall in 1975) with respect to an integration portion of the above equation (14), a mathematical expression of a closed form represented by the following equation (15) is obtained. The mathematical expression of the closed form also shows the probability that is detected by the energy detection (ED) using the selective combining (SC) in the Rayleigh fading channel. In the following equation (15), p is $\{2\times(n+1)\}^{1/2}$.

[Formula 10]

Formula 10

$$\overline{P}_{d,SC}(N, N_0) = 2N \sum_{n=0}^{N-1}(-1)^n \binom{N-1}{n}$$

$$\frac{1}{p^2}\exp\left(\frac{-b^2}{2}\right) \times \left\{\left[\frac{p^2+a^2}{a^2}\right]^{M-1}\left[\exp\left(\frac{1}{2}b^2\frac{a^2}{p^2+a^2}\right)-\right.\right.$$

$$\left.\left.\sum_{m=0}^{M-2}\frac{1}{m!}\left(\frac{1}{2}b^2\frac{a^2}{p^2+a^2}\right)^m\right]+\sum_{m=0}^{M-2}\frac{1}{m!}\left(\frac{b^2}{2}\right)^m\right\} \quad (15)$$

In the above equation (15), both a and b are defined on the basis of the number $N_0$ of sampling, a detection threshold value $\gamma_0$, the mean value $\Gamma_0$ of the SNR of the sensing channel over a long period, and the standard deviation $\sigma_z$ of noises in a radio receiver of the first secondary user (SU1). Specifically, a and b are defined as represented by the following equations (16) and (179.

$$a = (2\Gamma_0 N_0)^{1/2} \quad (16)$$

$$b = (2\gamma_0)^{1/2}/\sigma_z \quad (17)$$

<<Fixed Power Control Method According to the First Comparative Example>>

Next, the simple fixed power control method according to the first comparative example will be described. The power control method according to the first comparative example is compared with the power control method according to the first embodiment. In the simple fixed power control method, steps S8 and S9 in FIG. 4 described above are not executed.

Specifically, in the fixed power control method according to the first comparative example, first, each secondary user (SU) is initialized by loading software for the dynamic spectrum access (DSA) (step S1').

Next, the radio transmitter of the first secondary user (SU1) performs the first spectrum sensing and specifies the control channel (step S2'). By using the control channel, the first secondary user (SU1) receives an interference limit value of the primary user (PU) (step S3'). The interference limit value is specified by the two parameters ($\eta$ and $\xi$), as described above.

The transmission power of the first secondary user (SU1) is simply determined to be fixed to the maximum value $P_t$ of the transmission power satisfying the obtained interference limit value (step S4'). Next, the first secondary user (SU1) executes the energy detection (ED) using the selective combining (SC) as the second spectrum sensing using the multiple antenna (step S5').

Figure 9:
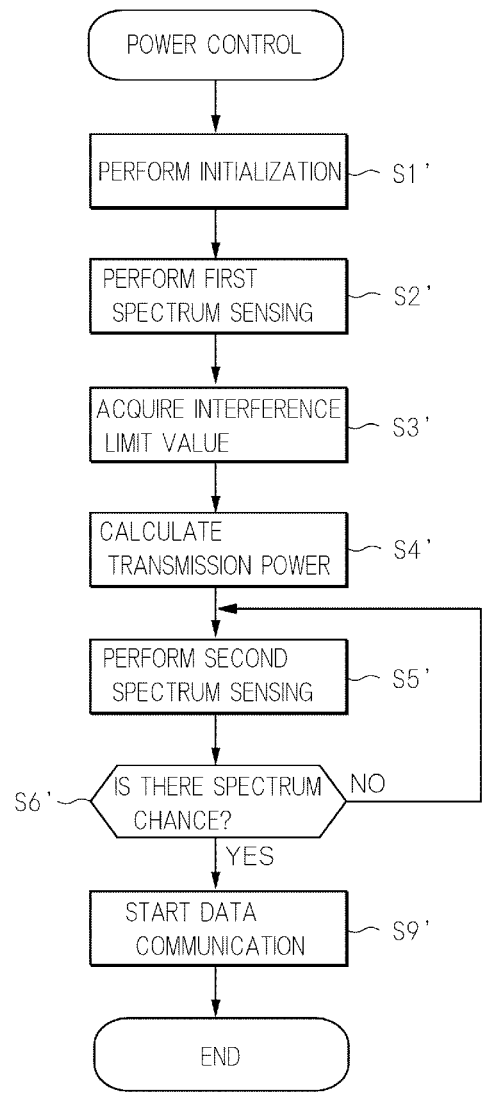
FIG. 9 is a flowchart illustrating a process sequence of a fixed power control method according to the first comparative example.

Then, after the spectrum-usable chance is obtained (YES in step S6'), the data communication (cognitive radio communication) between the secondary users (SU) is performed with the transmission power $P_t$ determined in step S4' (step S9'). A flowchart that illustrates a process sequence of the fixed power control method according to the first comparative example described above is illustrated in FIG. 9.

Meanwhile, when the maximum value of the transmission power in step S4' is determined, the first secondary user (SU1) needs a mathematical expression that relates to the distribution of the momentary INR in the interference channel and is represented as a function of constant transmission power.

Therefore, the momentary INR is represented by the following equation (18), on the basis of the analysis model.

[Formula 11]

Formula 11

$$I_n = \frac{P_t \Gamma_1}{2N}\beta^2 \quad (18)$$

In the above equation (18), $\beta^2$ conforms to a chi-square distribution that has a degree of freedom of 2N (that is, $\chi_{2N}^2$). In addition, a cumulative distribution function (CDF) with respect to the momentary INR is represented by the following equation (19).

[Formula 12]

Formula 12

$$F_{I_n}(x) = \left|\frac{\Gamma\left(\frac{xN}{P_t\Gamma_1}, N\right)}{\Gamma(N)}\right| \quad (19)$$

According to the fixed power control method according to the first comparative example, the transmission power of the first secondary user (SU1) is fixed and becomes constant. That is, in the fixed power control method according to the first comparative example, once the spectrum-usable chance is obtained, the transmission power does not change in the data communication between the secondary users (SU). This is because the processes of steps S8 and S9 described using FIG. 4 are not executed in the fixed power control method according to the first comparative example. In the fixed power control method according to the first comparative example, the distribution of the INR is determined by the Rayleigh fading of the interference channel.

Therefore, when the fixed power control method according to the first comparative example is used, the secondary user (SU) may apply interference to the primary user (PU) in the case of the miss detection (MD) as described above. In other words, in the fixed power control method according to the first comparative example, when the first secondary user (SU1) fails to detect the existence of the signal (for example, the pilot signal) of the primary user (PU), and the transmission power of the first secondary user (SU1) is large, thereby exceeding an interference power level $\eta$ as a predetermined threshold value included in the interference limit value, the secondary user (SU) is interfered with the primary user (PU).

Therefore, in the case of the miss detection (MD), the probability of a case where the INR exceeds the threshold value $\eta$ is represented by the following equation (20).

[Formula 13]

Formula 13

$$Pr\{I_n > \eta | MD\} = \{1 - \overline{P}_{d,SC}(N,N_0)\}\{1 - F_{I_n}(\eta)\} \quad (20)$$

In the above equation (20), since it is known that $Pr\{I_n > \eta | MD\}$ is a function of $P_t$, the radio transmitter of the first secondary user (SU1) can calculate the maximum value $P_t'$ such that $Pr\{I_n > \eta | MD\}$ becomes smaller than the parameter $\xi$ included in the interference limit value in step S4'.

In the plurality of secondary users (SU), once the spectrum-usable chance is obtained, the maximum ratio combining (MRC) is adopted with respect to the data communication with the fixed transmission power $P_t'$ in the first secondary user (SU1). In addition, the signaling scheme of binary phase shift keying (BPSK) is assumed to be performed in data communication between the secondary users (SU) and a bit error rate (BER) relating to the momentary output SNR in the radio receiver of the second secondary user (SU2) is represented by the following equation (21). The momentary output SNR is obtained in consideration of the transmission power $P_t'$ in the above equation (6). In the following equation (21), $\mu$ is represented by the following equation (21-1).

[Formula 14]

Formula 14

$$P_e = ((1-\mu)/2)^{NK} \sum_{m=0}^{NK-1} \binom{NK-1+m}{m} \left(\frac{1+\mu}{2}\right)^m \quad (21)$$

$$\mu = \sqrt{\frac{P_t' \Gamma_2}{N + P_t' \Gamma_2}} \quad (21\text{-}1)$$

<<Optimized Power Control Method According to the First Embodiment>>

Next, the optimized power control method according to the first embodiment will be described.

As described using FIG. 4, first, the radio receiver of the secondary user (SU) is initialized (step S1). Next, the control channel is specified by the first spectrum sensing (step S2) and the interference limit value is acquired (step S3). Finally, the constant output of the SNR in the radio receiver of the second secondary user (SU2) is maximized while the interference with respect to the primary user (PU) is maintained in a range of the interference limit value (steps S8 and S9).

In step S4, the radio transmitter of the first secondary user (SU1) optimizes the transmission output thereof in a state in which the inference power with respect to the primary user (PU) is maintained in the range of the interference limit value and calculates (estimates) the maximum value of the output SNR that can be obtained in the radio receiver of the second secondary user (SU2).

In step S5, the first secondary user (SU1) executes the energy detection (ED) using the selective combining (SC) as the second spectrum sensing. Next, if the spectrum-usable chance is obtained (step S6), the radio transmitter of the first secondary user (SU1) transmits the calculated maximum value of the output SNR as a target level to the radio receiver of the second secondary user (SU2) (step S7).

Next, in step S8, the radio receiver of the second secondary user (SU2) measures a channel in each fading block and transmits a command to the radio transmitter of the first secondary user (SU1). Thereby, the radio transmitter of the first secondary user (SU1) increases or decreases the transmission power, such that the output SNR is maintained at the target level. Next, the data communication is performed between the first secondary user and the second secondary user (step S9).

Meanwhile, in step S4, the first secondary user (SU1) needs a mathematical expression where the distribution of the momentary INR (considering the change of the transmission power) is represented as a function of the constant output of the SNR (signal-to-noise ratio, a ratio of signal with respect to a noise) of the user channel. Hereinafter, introduction of the mathematical expression will be described. The mathematical expression is used together with the function relating to the probability of detection of the energy detection (ED) using the selective combining (SC) and the maximum value of the constant output of the SNR in the radio receiver of the second secondary user (SU2) can be obtained. In the first embodiment, by using the SNR value, the data communication between the secondary users (SU) using the signaling of the BPSK is examined.

The output SNR of the user channel for the communication in the maximum ratio combining (MRC) when the N transmitting antennas and the K receiving antennas are used is represented by the following equation (22), on the basis of the above equation (6).

[Formula 15]

Formula 15

$$SNR_0 = \frac{P_t \Gamma_2 \gamma^2}{2N} \quad (22)$$

In the above equation (22), $\gamma^2$ conforms to a chi-square distribution that has a degree of freedom of 2NK (that is, $\chi_{2NK}^2$). When the optimized power control according to the present invention is performed, the transmission power $P_t$ is adjusted such that the output SNR in the secondary user (SU) is maintained at $SNR_0$ fixed to a desired value. The desired output SNR value can be calculated from a Shannon capacity equation relating to a predetermined frequency domain. In this case, the transmission power $P_t$ is adjusted without losing universality, such that the output SNR is maintained to be fixed at a nominal value $\alpha$. That is, when the following equation (23-1) is considered, the transmission power $P_t$ is given by the following equation (23-2).

[Formula 16]

Formula 16

$$\frac{SNR_0}{\Gamma_2} = \alpha \quad (23\text{-}1)$$

$$P_t = \frac{2\alpha N}{\gamma^2} \quad (23\text{-}2)$$

As can be seen from the above equation (23-2), the transmission power $P_t$ is a random variable RV and a distribution thereof depends on $\gamma^2$.

According to the system model, the momentary INR in the primary user (PU) is represented by the following equation (24).

[Formula 17]

Formula 17

$$I_n = \frac{\alpha \Gamma_1 \beta^2}{\gamma^2} \quad (24)$$

As can be seen from the above equation (24), the distribution of the INR depends on a ratio of the two chi-square distributions RV. The fixed power control method according to the first comparative example is different from the optimized power control method according to the first embodiment. In the optimized power control method according to the first embodiment, the transmission power of the secondary user (SU) with respect to the Rayleigh fading is adjusted under the interference limit value and as a result, the constant output SNR in the radio receiver of the second secondary user (SU2) takes a maximum value. That is, the Rayleigh fading of the interference channel and the change of the transmission power are considered in the optimized power control method according to the first embodiment and the distribution of the momentary INR in the primary user (PU) is determined.

By using the standard RV conversion, the probability density function (PDF) of the momentary INR (that is, $I_n$) in the primary user (PU) is obtained as represented by the following equation (25-1). By using the PDF, the cumulative distribution function (CDF) of the momentary INR in the primary user (PU) is represented by the following equation (25-2).

[Formula 18]

Formula 18

$$f_{I_n}(x) = \frac{1}{\alpha \Gamma_1} \int_0^\infty v \chi_{2N}^2\left(\frac{xv}{\alpha \Gamma_1}\right) \chi_{2NK}^2(v) dv \quad (25\text{-}1)$$

$$= \left(\frac{x}{\alpha}\right)^{N-1} \left(1 + \frac{x}{\alpha \Gamma_1}\right)^{-N(K+1)} \frac{\Gamma(NK+N)}{\Gamma(N)\Gamma(NK)\alpha\Gamma_1}$$

$$F'_{I_n}(x) = \int_0^x f_{I_n}(v) dv \quad (25\text{-}2)$$

$$= {}_2F_1\left(N, N+NK; N+1; -\frac{x}{\alpha\Gamma_1}\right)$$

$$\left(\frac{x}{\alpha\Gamma_1}\right)^N \frac{\Gamma(NK+N)}{N\Gamma(N+1)\Gamma(NK)}$$

In the above equation (25-2), $_2F_1$ (a, b; c; z) is a hypergeometric function. However, in the calculation, a mean value of the INR is needed as a numerical value that shows a statistical characteristic of the interference channel over a long period.

In consideration of the sensing, the probability $P_r$ when the INR in the primary user (PU) becomes greater than the interference power level η in the case of the miss detection (MD) is represented by the following equation (26).

[Formula 19]

Formula 19

$$Pr\{I_n > \eta | MD\} = \{1 - \bar{P}_{d,SC}(N,N_0)\}\{1 - F_{I_n}'(\eta)\} \quad (26)$$

As can be seen from the above equation (27), the probability $P_r$ becomes a function of a nominal value α. By using the optimized power control method according to the first embodiment in the communication between the secondary users (SU), the constant output of the SNR becomes $\alpha \Gamma_2$. The BER (bit error rate) relating to the BPSK signaling is directly calculated on the basis of the following equation (27).

$$P_e = Q(2\alpha T_2)^{1/2} \quad (27)$$

<Numerical Result>

Next, the numerical result with respect to the analysis models of the first embodiment and the first comparative example will be described. Specifically, the numerical result shows performance of the data communication between the secondary users (SU).

First, the numerical result that is verified with respect to introduction of the mathematical equation (equation 15) of the closed form with respect to the probability of detection by the energy detection (ED) using the selective combining (SC) in the Rayleigh fading channel will be described.

A situation where the N antennas exist in the first secondary user (SU1) and the independent Rayleigh fading is observed with the same mean value $\Gamma_0$ of the SNR is considered. In each fading block, the antenna where the momentary SNR takes the maximum value is selected. In addition, the energy detection (ED) is performed using the selected antenna and it is determined whether or not the signal of the primary user (PU) exists.

Figure 5:
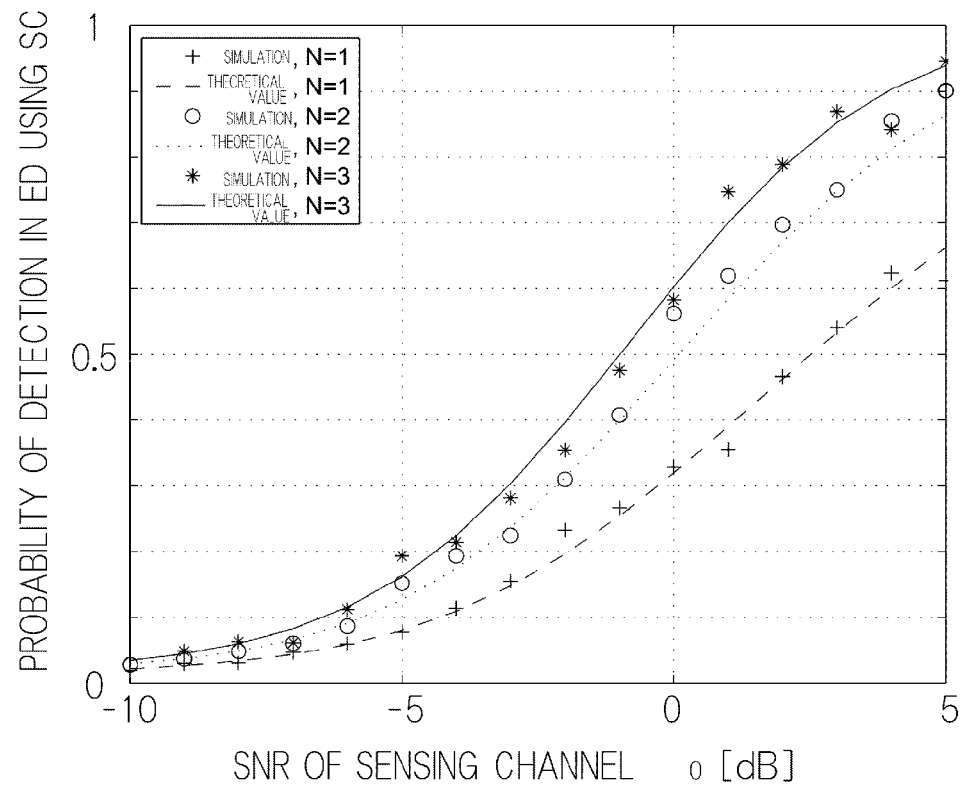
FIG. 5 is a diagram illustrating the probability of detection.

FIG. 5 is a diagram illustrating the probability of detection. Specifically, in FIG. 5, the probability of detection that is calculated by using the above equation (15) is shown as a theoretical value when the number N of antennas is changed in the case where the mean value $\Gamma_0$ of the SNR of the sensing channel varies from −10 dB to 5 dB. In this case, the detection threshold value that is obtained by setting the false alarm rate $P_f$ as 0.01 in the above equation (9) is used. The number $N_0$ of samples for the energy detection (ED) is set to 0. The experimental probability of detection that is obtained from a Monte-Carlo simulation where $10^5$ channels are realized is also shown as the simulation result in FIG. 5.

From the result, it can be seen that performance is improved in the energy detection (ED) using the selective combining (SC). For example, if the energy detection (ED) using the selective combining (SC), when the number N of antennas is 3, is used, the probability of detection is improved from 0.3 to 0.6 when the SNR of the sensing channel is 0 dB. Since the theoretical probability of the detection and the experimental probability of the detection are significantly matched with each other, it is verified that the introduction of the above equation (15) is correct.

With respect to the optimized power control method according to the first embodiment, the distribution of the momentary INR in the primary user (PU) is examined. By using the above equation (25-2), the cumulative distribution function (CDF) of the INR in the primary user (PU) when the optimized power control method is applied to the radio transmitter of the first secondary user (SU1) is obtained. The cumulative distribution function (CDF) is the function of the nominal value α that is defined in the above equation (22), as described above.

Figure 6:
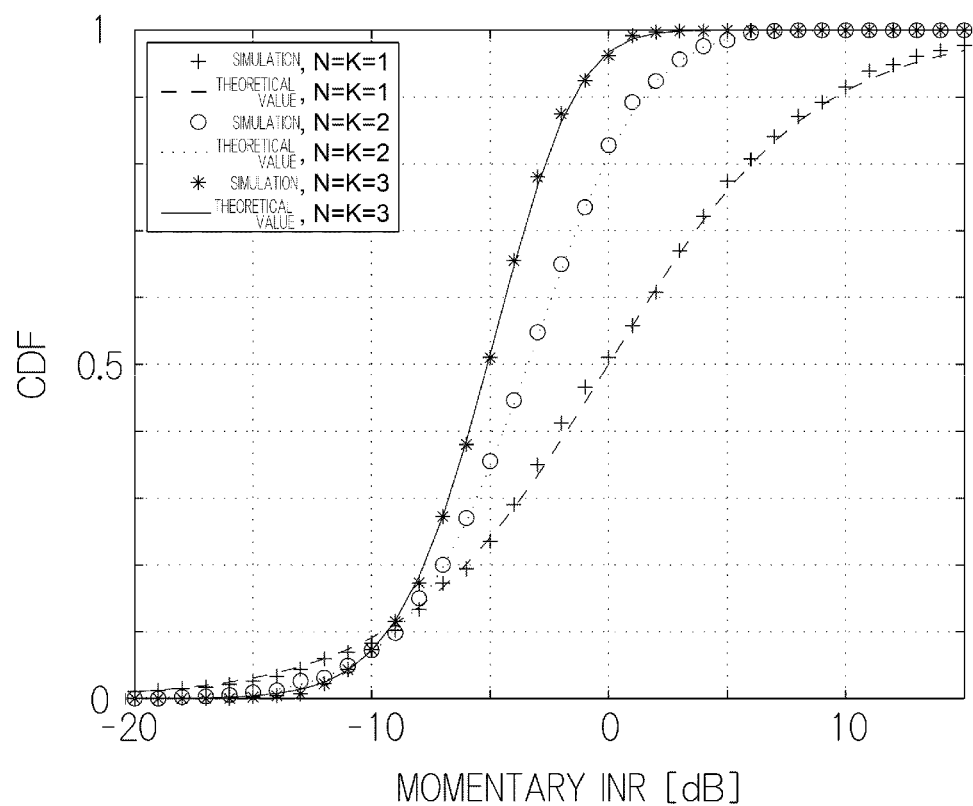
FIG. 6 is a diagram illustrating a cumulative distribution function (CDF) according to changes of the number of antennas of secondary users (SU) changes.

FIG. 6 is a diagram illustrating the cumulative distribution function (CDF) when the number of antennas of the secondary user (SU) is changed in the case where the nominal value α is set to 1 and $\Gamma_1$ is set to 0 in the above equation (25-2). The experimental cumulative distribution function (CDF) that is obtained from a Monte-Carlo simulation where $10^5$ channels are realized is also illustrated as the simulation result in FIG. 6.

From the result, it can be seen that a curve of the cumulative distribution function (CDF) is shifted to the left side when the number of antennas increases. For example, the probability when the momentary INR is smaller than 0 dB increases from 0.5 to 0.97. This shows that the interference with respect to the primary user (PU) may be decreased. Since the theoretical cumulative distribution function (CDF) and the experimental cumulative distribution function (CDF) are significantly matched with each other, it is verified that the introduction of the above equation (25-2) is correct.

Next, the performance of the optimized power control method according to the first embodiment and the performance of the fixed power control method according to the first comparative example are compared using the analysis result.

Meanwhile, as described above, in the fixed power control method according to the first comparative example, it is a final target to obtain the maximum value of the constant transmission power $P_t$ to satisfy the interference limit value. Meanwhile, in the optimized power control method according to the first embodiment, it is a final target to obtain the maximum value (that is, $\alpha\Gamma_2$) of the constant output of the SNR to satisfy the interference limit value.

In this simulation, a combination where the interference power level η is 0 and the maximum probability ξ is 0.1 is used as the interference limit value.

Figure 7:
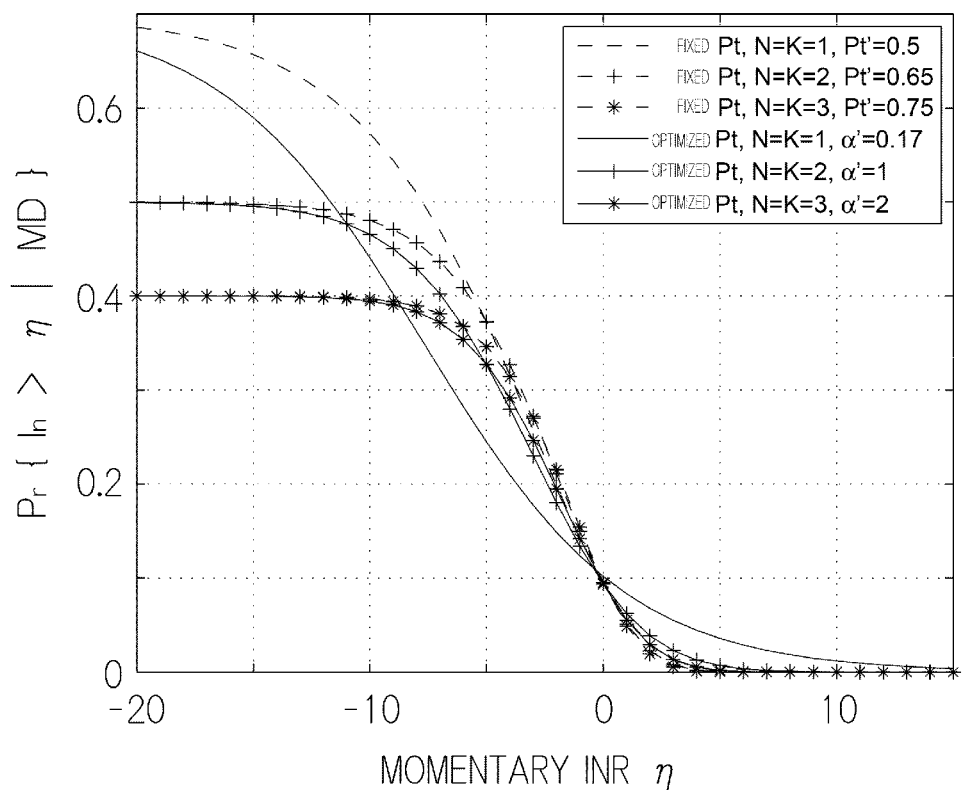
FIG. 7 is a diagram illustrating the probability $P_r\{I_n > \eta |$ MD (miss detection)$\}$ in a first embodiment and a first comparative example.

FIG. 7 is a diagram illustrating the probability $P_r$ $\{I_n > \eta | MD\}$ in the first embodiment and the first comparative example. Specifically, the result where the above equations (20) and (26) are used is illustrated in FIG. 7. A shape of each curved line that is illustrated in FIG. 7 is determined by $P_t$ and the nominal value α for the corresponding power control method. In explanatory notes illustrated in FIG. 7, desired values of $P_t$ and the nominal value α to satisfy the interference limit value are illustrated. As can be seen from FIG. 7, when the maximum ratio combining (MRC) is used in the case where two transmitting antennas and the two receiving antennas are used in the data communication between the secondary users (SU), $P'_t$ is 0.65 in the fixed power control method according to the first comparative example and α' is 1 in the optimized power control method according to the first embodiment. As such, values of $P'_t$ and α' can be extracted on the basis of FIG. 7.

Figure 8:
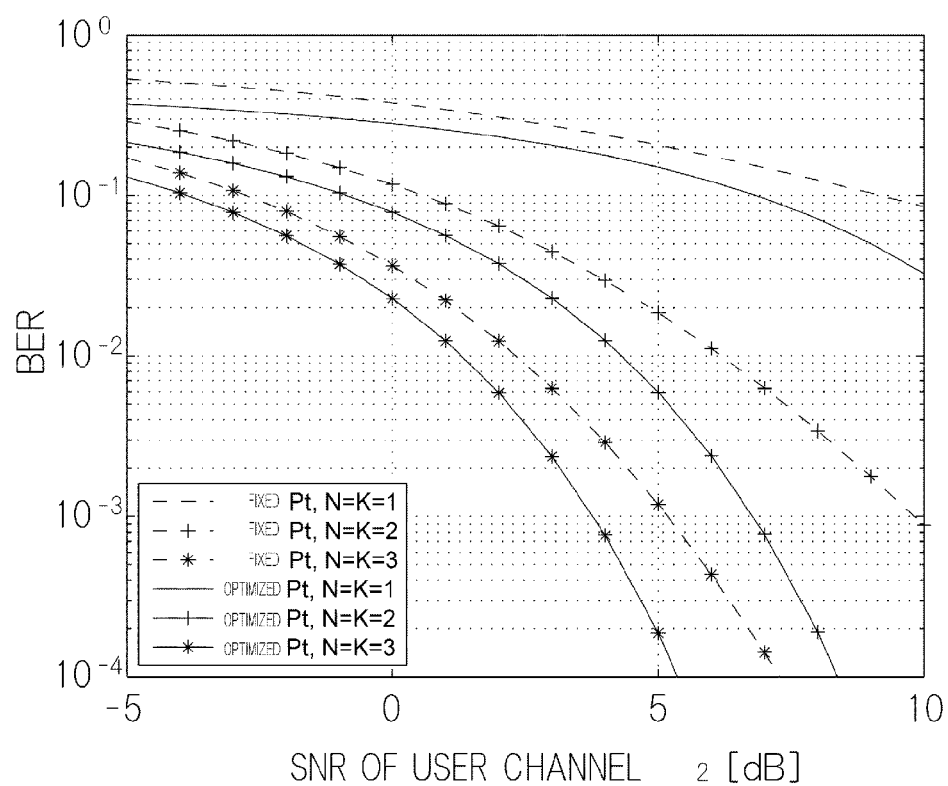
FIG. 8 is a diagram illustrating performance of a bit error rate (BER) of communication between the secondary users (SU).

FIG. 8 is a diagram illustrating performance of a bit error rate (BER) of the communication between the secondary users (SU). Specifically, FIG. 8 illustrates the bit error rate (BER) in the fixed power control method according to the first comparative example and the bit error rate (BER) in the optimized power control method according to the first embodiment, when the mean value of the SNR of the user channel $\Gamma_2$ is different. Mathematical expressions to analyze the bit error rate (BER) correspond to the above equations (21) and (27) using the independent variables $P'_t$ and α'. In this case, it is assumed that the mean value of the SNR over a long period in both the sensing channel and the interference channel is equalized to 0 (that is, $\Gamma_0$=0 dB and $\Gamma_1$=0 dB). As can be seen from FIG. 8, the optimized power control method according to the first embodiment is superior to the fixed power control method according to the first comparative example in that the number of antennas is different. For example, when BER is $10^{-3}$ and the data communication using the BPSK is performed using the two radio transmitting antennas and the two receiving antennas, in the optimized power control method according to the first embodiment, the SNR is improved by 3 dB as compared with the fixed power control method according to the first comparative example. If the fixed power control method according to the first comparative example is applied to the cognitive radio communication system (CRS), the radio receiver of the maximum rate combining (MRC) type of the secondary user (SU) observes the random SNR values according to the chi-square distribution having the mean value $P'_t \Gamma_2 K$. Meanwhile, if the optimized power control method according to the first embodiment is applied to the cognitive radio communication system (CRS), the radio receiver of the maximum rate combining (MRC) type of the secondary user (SU) generates an equivalent AWGN channel having an SNR value of α' $\Gamma_2$.

INDUSTRIAL APPLICABILITY

The present invention is suitable for a field of the radio communication, particularly, the cognitive radio communication.

DESCRIPTION OF REFERENCE SIGNS 1, 5 base station
10 radio communication device (primary user (PU))
20, 20a, 20b radio communication device (secondary user (SU))
21 receiving unit
22 multiple antenna
23 bandpass filter
24 RF
27 spectrum sensor unit
29 baseband processor
30 sensing channel
40 interference channel
50 user channel
100 cognitive radio communication system

The invention claimed is:

1. A power control method that controls communication power to be used for cognitive radio communication, the power control method comprises:
an estimating step of estimating a target value of an SNR (SN ratio) based on control information relating to interference; and
an adjusting step of adjusting the communication power based on the target value of the SNR estimated by the estimating step:
wherein a radio communication system that performs the cognitive radio communication includes
a base station for the cognitive radio communication,
a first radio communication device that can perform radio communication, and
a second radio communication device that can perform the radio communication,
the first radio communication device includes
a radio receiver,
the second radio communication device includes
a radio transmitter,
the power control method further comprises
a transmitting step of transmitting the control information relating to the interference to the radio receiver of the first radio communication device by the base station,
in the estimating step, the radio receiver of the first radio communication device estimates the target value of the SNR based on the control information and notifies the radio transmitter of the second radio communication device of a command including the target value of the SNR,
in the adjusting step, the radio transmitter of second radio communication device adjusts transmission power to transmit a radio signal to the second radio communication device based on the target value of the SNR, and
the first radio communication device performs the cognitive radio communication with the transmission power between the second radio communication device and the first radio communication device.

2. The power control method according to claim 1, wherein the SNR corresponds to one constant output value that can be selected from a plurality of constant output values, and
the adjusting step includes
a step of selecting a maximum value of the constant output values not exceeding the target value of the SNR among the plurality of constant output values, and
a step of changing an output value to the constant output value becoming the maximum value, as adjustment of the communication power.

3. The power control method according to claim 1, wherein the control information relating to the interference includes an interference power level in the first radio communication device and a maximum value of the probability of an interference value in the first radio communication device exceeding the interference power level η.

* * * * *